United States Patent [19]

French

[11] Patent Number: 4,990,002
[45] Date of Patent: Feb. 5, 1991

[54] MOTOR CONTROL CIRCUIT

[75] Inventor: Alan P. French, Ravenna, Ohio

[73] Assignee: Ametek, Inc., Kent, Ohio

[21] Appl. No.: 242,901

[22] Filed: Sep. 12, 1988

[51] Int. Cl.$^5$ .............................................. H02P 7/62
[52] U.S. Cl. ..................... 388/833; 388/832; 388/915; 318/806
[58] Field of Search .................. 318/309–314, 318/322, 315, 329, 334, 345 D, 345 F, 345 G, 345 H, 798–799, 807–812; 323/242–244; 388/801, 803–806, 811–815, 819–822, 903, 915–916, 911, 829, 830–833

[56] References Cited

U.S. PATENT DOCUMENTS

| | | | |
|---|---|---|---|
| 3,891,902 | 6/1975 | Konrad | 318/139 |
| 4,152,758 | 9/1977 | Bailey et al. | 388/819 |
| 4,191,914 | 3/1980 | Lecluse | 318/139 |
| 4,298,834 | 11/1981 | Opfer | 318/806 |
| 4,410,842 | 10/1983 | Owen | 318/139 |
| 4,439,718 | 3/1984 | Nola | 318/812 |
| 4,445,078 | 4/1984 | Lange | 318/805 |
| 4,568,193 | 2/1986 | Contri et al. | 318/325 |
| 4,677,353 | 6/1987 | Shieh | 318/128 |

*Primary Examiner*—William M. Shoop, Jr.
*Assistant Examiner*—David Martin
*Attorney, Agent, or Firm*—Renner, Kenner, Greive, Bobak, Taylor & Weber

[57] ABSTRACT

A control circuit for maintaining power output of a motor, irrespective of amplitude changes in line voltage. The output of an amplifier is indicative of the line voltage. A ramp generator generates a ramp voltage which is consistent and repetitive, irrespective of changes in the line voltage. A comparison is made between the ramp voltage and the amplifier output, causing a triac to fire when the two are equal. The equalization point is a point at which sufficient power can be derived from the remainder of the line voltage to assure consistent and repetitive operation.

11 Claims, 1 Drawing Sheet

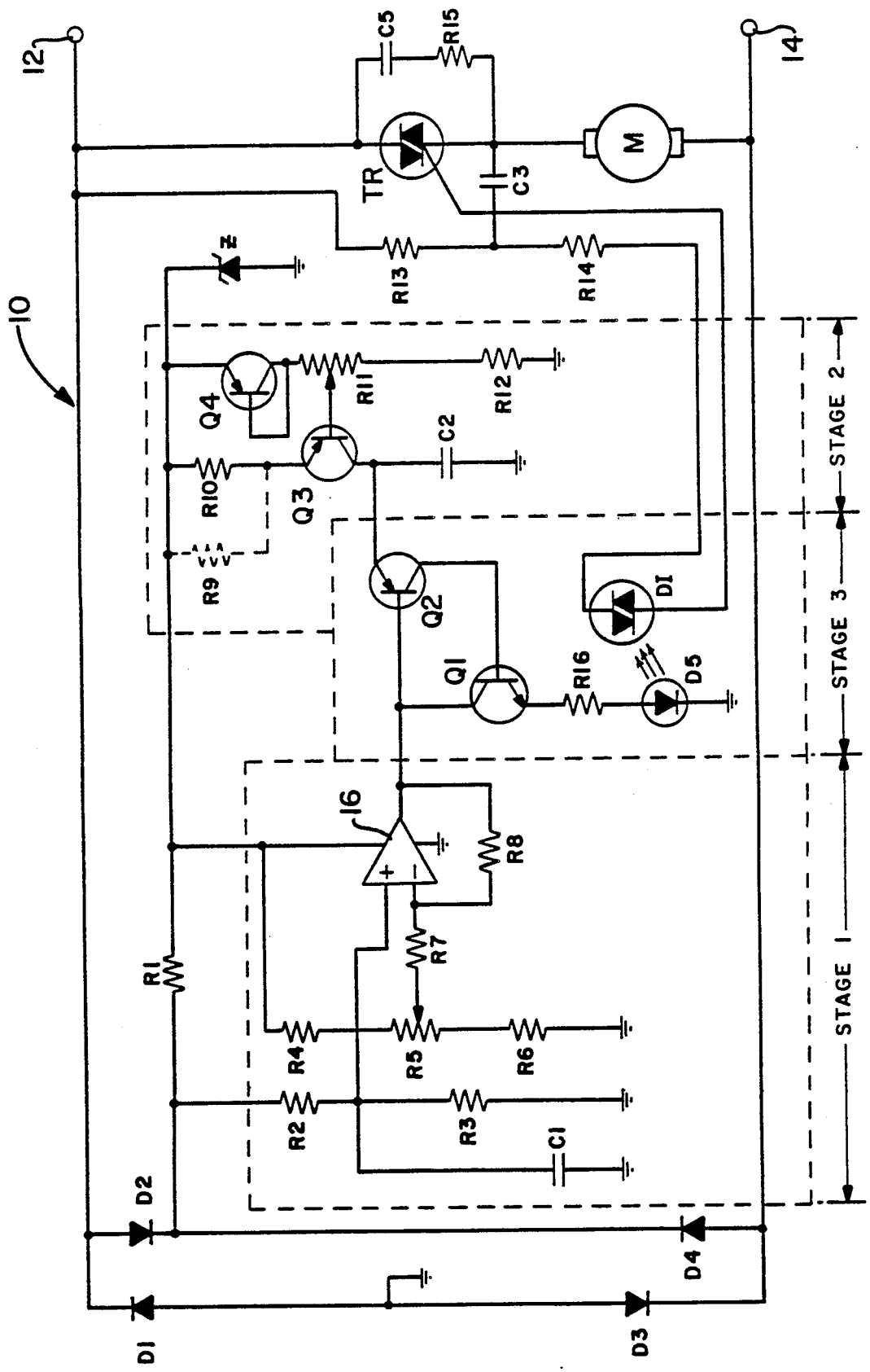

MOTOR CONTROL CIRCUIT

TECHNICAL FIELD

The invention herein resides in the art of electric motors and, more particularly, to control circuits for maintaining a constant power output from a motor irrespective of changes in the voltage input.

BACKGROUND ART

Heretofore it has been known that the amplitude of line voltages often changes with time. Such changes of line voltage necessarily result in changes in the power input and output of devices operating off of the line voltage. However, certain devices require a relatively constant power output irrespective of changes in power input. By way of example only, air knives, used for transporting paper in copy machines, require that a constant level of vacuum be delivered by the vacuum motor and that the same not change over a course of time, regardless of changes on the power input line. While an air knife is only a single example of a device requiring the benefits of the instant invention, consistency of operation is desired in numerous devices and applications, all of which may benefit from the invention presented herein.

It is further desirable to assure constant performance of various devices at different frequencies of input voltage. It is known that voltage and frequencies vary from country to country. It is most desirable to provide a control circuit which assures proper efficient operation within a range of line frequencies to accommodate such difference.

In a vacuum device, such as an air knife, it is also known that the resultant vacuum is affected by altitude and, accordingly, it is desirable to provide a means for compensating for changes in altitude. Further, it is known that operation varies with temperature changes and, accordingly, it is desirable to provide a control circuit which renders motor operation impervious to such temperature changes.

DISCLOSURE OF INVENTION

In light of the foregoing, it is a first object of the invention to provide a motor control circuit which provides for constant power output over a range of amplitude changes in voltage input.

Another aspect of the invention is to provide a motor control circuit which provides for constant power output at various frequencies of voltage input.

Still a further aspect of the invention is the provision of a motor control circuit which provides for constant power output at various altitudes of operation.

Yet a further aspect of the invention is the provision of a motor control circuit which provides for constant power output over an anticipated range of temperatures.

Still another aspect of the invention is the provision of a power control circuit which is durable and reliable in operation, inexpensive to construct and implement, and easy to employ with state-of-the-art elements.

The foregoing and other aspects of the invention which will become apparent as the detailed description proceeds are achieved by a control circuit for regulating power from line voltage to a motor, comprising: first means connected to the line voltage and generating a first signal as a function of the line voltage; a ramp generator providing a ramp signal; second means interconnected between said first means and said ramp generator for comparing said ramp and first signals, generating a second signal when said ramp signal exceeds said first signal; and power phase control means interconnected between said line voltage, said second means, and the motor for passing power to the motor upon receipt of said second signal.

Yet further aspects of the invention are attained by a motor control circuit for regulating power from a line voltage to a motor, comprising: a ramp generator operatively connected to the line voltage and generating a ramp signal at periodic intervals of the line voltage; an amplifier connected to the line voltage and generating a first signal as a function thereof; a switching circuit interconnected between said ramp generator and amplifier, generating a second signal when said ramp signal exceeds said first signal; and a power phase control circuit interconnected between the motor and said switching circuit, passing power to the motor upon receipt of said second signal.

DESCRIPTION OF DRAWING

For a complete understanding of the objects, techniques, and structure of the invention, reference should be had to the following detailed description and accompanying drawing wherein there is shown a circuit schematic of the motor control circuit of the invention.

BEST MODE FOR CARRYING OUT THE INVENTION

With reference now to the drawing, it can be seen that the motor control circuit according to the invention is designated generally by the numeral 10. As further shown, the circuit 10 is operatively interconnected at the terminals 12,14 to an appropriate sinusoidal line voltage. The circuit 10 is operative for regulating the vacuum generated by the vacuum motor M and to maintain the vacuum at a constant level irrespective of changes in voltage between 104 and 127 volts RMS. As will become apparent hereinafter, the circuit 10 senses the line voltage and, by using linear amplifiers, fires a triac in order to deliver approximately constant energy to the series universal motor M. The control logic of the circuit 10 is of low power consumption and is divided into three stages as will be discussed below.

In stage one, a differential amplifier 16 is connected to compare the sinusoidal input line voltage to a reference voltage and, after application of an appropriate gain factor, a phase-locked output signal is provided. As shown, the sinusoidal line voltage is converted to a full wave rectified voltage by means of the full wave rectifier D1–D4. This full wave rectified signal is converted to a DC level by means of resistors R2,R3 and capacitor C1. This DC voltage is applied to the positive input of the amplifier 16. The full wave rectified signal is clamped by means of the zener diode Z and is current limited by means of the resistor R1. The clamped voltage level is applied as the power source to the amplifier 16 and is used to generate a reference voltage for the negative input of the amplifier 16 through the resistors R4,R5,R6. As shown, resistor R5 comprises a potentiometer, allowing the reference voltage to be adjustable as will later be shown for purposes of adjusting the vacuum level of the motor by changing the firing point of the triac in relation to the input voltage sinusoidal curve. The operational amplifier 16 amplifies the difference between the DC level and the reference voltages as a function of the values of the gain resistors R7,R8. It will also be appreciated that the amplifier 16 turns off at each sinusoidal half cycle interval due to the voltage being supplied thereto passing to zero. This assures that amplifier 16 is phase locked with the line voltage.

As will be apparent to those skilled in the art, stage two of the circuit 10 comprises a ramp generator, by which a linear ramp is created. In the preferred embodiment, the slope of the ramp is proportional to the area added to the sinusoidal input voltage between 104 volts RMS and 127 volts RMS. Due to the phase lock of the zener diode Z, resulting from the zener voltage going to zero each time the sinusoidal input voltage goes through zero, the ramp generator turns on at the beginning of each phase. The ramp is established through the transistor Q3 providing a constant current to the capacitor C2. The current level is a function of the base voltage applied to the transistor Q3 and the value of the resistor R10. The base voltage is established at the tap point of the potentiometer R11. As is well known to those skilled art, the transistor Q4 serves to temperature compensate the base-emitter junction of transistor Q3, to assure a non-varying ramp slope over a range of temperatures such as 0°-75° C. The branch comprising transistor Q4 and resistors R11,R12 serves to assure an appropriate and stable base voltage to the transistor Q3 to achieve the necessary constant current to the capacitor C2 to assure a repetitious ramp.

In stage three of the circuit 10, the ramp voltage of stage two is compared to the operational amplifier output voltage of stage one and an optic coupler which drives the gate of the triac causes the triac to fire. In operation, when the ramp voltage at the capacitor C2 exceeds the output voltage of the amplifier 16 (by more than a base-emitter drop) a base current will flow in transistor Q2. This causes a base current in transistor Q1 which then shorts the output of both stages one and two, discharging capacitor C2 through the light emitting diode D5. This will optically activate the diac DI which, in turn, fires the triac TR to allow line voltage application to the motor until the triac turns off when the line voltage passes to zero, in standard fashion. Accordingly, the motor M only sees line voltage for a period of time following the equalization of the ramp voltage and the output of the amplifier 16. It will be appreciated that the triac TR will be fired earlier for progressively low line voltage amplitudes, and later for progressively higher ones. It will further be appreciated that resistor R16 is provided for purposes of current limitation. Finally, following the discharge of capacitor C2, it will be understood that the ramp will begin to charge again and the process will repeat or be restarted by means of the phase lock.

It will be understood by those skilled in the art that the capacitor C5 and resistor R15 provide snubbing to prevent commutation or false firing of the triac TR. In like manner, capacitor C3 and resistors R13,R14 provide for snubbing of the diac DI. It will also be appreciated that in the preferred embodiment the motor comprises a series universal motor with a single stage fan, the same incorporating a thermal and locked rotor protection system. The electronic controller of FIG. 10 is preferably enclosed with the motor in a canister assembly providing mounting features and noise reduction for the consumer.

It has been found that, utilizing the circuit 10, a holding vacuum may be generated and held constant irrespective of line voltage changes between 104 volts RMS and 127 volts RMS. It has also been found that, by changing the emitter resistance of transistor Q3 by switching from resistor R10 to R9, the resultant ramp voltage may be changed to assure maintenance of desired vacuum at both 50 hz and 60 hz.

The potentiometer R11 may be employed to calibrate the output of the ramp generator (the slope of the ramp itself) as well as providing compensation for tolerances in various electronic components.

The potentiometer R5 may be employed to adjust the firing point of the triac TR by changing the output of the operational amplifier 16 in accordance with the equation $V_{out}=K(V_{in}-V_{ref})$. The circuit is designed to hold the vacuum within a 10% range over a spectrum of altitude adjustment settings. By using linear amplifiers to approximate the area added to the sinusoidal line input voltage from 104 volts RMS to 127 volts RMS, significantly better regulation is realized at the calibration set point.

It should now be appreciated that the control circuit of the invention is operative for maintaining power output of a motor, irrespective of amplitude changes in line voltage. The output of the amplifier 16 is indicative of line voltage. The ramp generator of R10,Q3,C2 generates a ramp voltage which is consistent and repetitive, irrespective of changes in the line voltage. A comparison is made between the ramp voltage and the amplifier output, causing the triac TR to fire when the two are equal. The equalization point is that point at which sufficient power can be derived from the remainder of the line voltage to assure consistent and repetitive operation.

Thus is can be seen that the objects of the invention have been satisfied by the structure presented hereinabove. While in accordance with the Patent Statutes only the best mode and preferred embodiment of the invention has been presented and described in detail, it is to be understood that the invention is not limited thereto or thereby. Accordingly, for an appreciation of the true scope and breadth of the invention, reference should be had to the following claims.

What is claimed is:

1. A control circuit for regulating power from a sinusoidal line voltage to a motor, comprising:
    first means connected to the line voltage and generating a first signal as a function of the line voltage, said first means comprising an amplifier comparing the line voltage to a reference voltage and amplifying the difference, said amplifier being inactivated an reactivated upon the line voltage passing through a neutral voltage potential;
    a ramp generator producing a ramp signal;
    second means interconnected between said first means and said ramp generator for comparing said ramp and first signal, generating a second signal when said ramp signal exceeds said first signal;
    power phase control means interconnected between said line voltage, said second means, and the motor for passing power to the motor upon receipt of said second signal; and
    a full wave rectifier receiving the line voltage and generating a full wave rectified signal therefrom, said full wave rectified signal being applied as an input to said amplifier, and a zener diode clamping said full wave rectified signal to establish a clamped signal which establishes said reference voltage and powers said amplifier.

2. The control circuit according to claim 1 wherein said reference voltage is adjustable.

3. The control circuit according to claim 1 wherein said ramp generator comprises a constant current source.

4. The control circuit according to claim 3 wherein said constant current source comprises a resistor and capacitor establishing a ramp rate.

5. The control circuit according to claim 4 wherein said constant current source is temperature compensated.

6. The control circuit according to claim 4 wherein said resistor may be varied as to value as a function of the frequency of the line voltage.

7. The control circuit according to claim 4 wherein said ramp generator is initiated periodically and phased with the line voltage.

8. The control circuit according to claim 1 wherein said second means comprises gate means interposed between said first means and ramp generator, said gate means being conductive when said ramp signal exceeds said first signal.

9. The control circuit according to claim 8 wherein said power phase control means comprises a diac interconnected with a triac, said diac switched to conduction by said gate means.

10. The control circuit according to claim 9 wherein said diac is switched by an optic coupler energized by said gate means.

11. The control circuit according to claim 8 wherein said gate means comprises a transistor having a junction thereof interconnected between said first means and said ramp generator.

* * * * *